(12) United States Patent
Nava et al.

(10) Patent No.: US 8,533,951 B2
(45) Date of Patent: Sep. 17, 2013

(54) JOINING METHOD

(75) Inventors: Paul Nava, Troisdorf (DE); Andreas Wohlfahrt, Luedinghausen (DE)

(73) Assignees: Fraunhofer-Gesellschaft zur Foerderung der angewandten Forschung e.V., Munich (DE); Flagsol GmbH, Cologne (DE)

( * ) Notice: Subject to any disclaimer, the term of this patent is extended or adjusted under 35 U.S.C. 154(b) by 346 days.

(21) Appl. No.: 12/918,867

(22) PCT Filed: Aug. 6, 2008

(86) PCT No.: PCT/EP2008/006444
§ 371 (c)(1),
(2), (4) Date: Jan. 28, 2011

(87) PCT Pub. No.: WO2009/106103
PCT Pub. Date: Sep. 3, 2009

(65) Prior Publication Data
US 2011/0113629 A1 May 19, 2011

(30) Foreign Application Priority Data
Feb. 25, 2008 (DE) .......................... 10 2008 010 884

(51) Int. Cl.
*B23P 15/26* (2006.01)
*B65H 69/02* (2006.01)

(52) U.S. Cl.
USPC .................... 29/890.033; 29/525.13; 156/157

(58) Field of Classification Search
USPC ....................... 29/890.033, 525.13
See application file for complete search history.

(56) References Cited

U.S. PATENT DOCUMENTS 2,255,184 A  9/1941  Osenberg
2,993,110 A * 7/1961  Godley ........................... 219/99
(Continued)

FOREIGN PATENT DOCUMENTS

CN  1190056  8/1998
CN  1782008  6/2006

(Continued)

OTHER PUBLICATIONS

The First Notification of the Office Action issued in connection with Chinese patent application No. 200880127668.5, issued Jul. 3, 2012 by the State Intellectual Property Office of the People's Republic of China (including English Translation).

(Continued)

*Primary Examiner* — David Bryant
*Assistant Examiner* — Jun Yoo
(74) *Attorney, Agent, or Firm* — Occhiuti Rohlicek & Tsao LLP

(57) ABSTRACT

Producing a solar trough collector includes fastening a mirror to a structure so that the mirror connects to the structure and has a holding container and a mirrored side facing away from the holding container, the mirror and structure forming joining components, aligning the mirror and structure into a joining position to form a joining gap between joining surfaces; at least temporarily fixing the joining components in the joining position by laying the mirrored side downward in a first holding device, suspending the structure in a second holding device arranged above the mirror, and moving holding devices into the joining position; filling the joining gaps with a joining medium; and allowing the joining medium to harden in the gap to form a permanent connection, wherein the holding devices are held in position until the joining medium has at least partially hardened.

14 Claims, 2 Drawing Sheets

(56) References Cited

U.S. PATENT DOCUMENTS

Figures 1A, 1B:
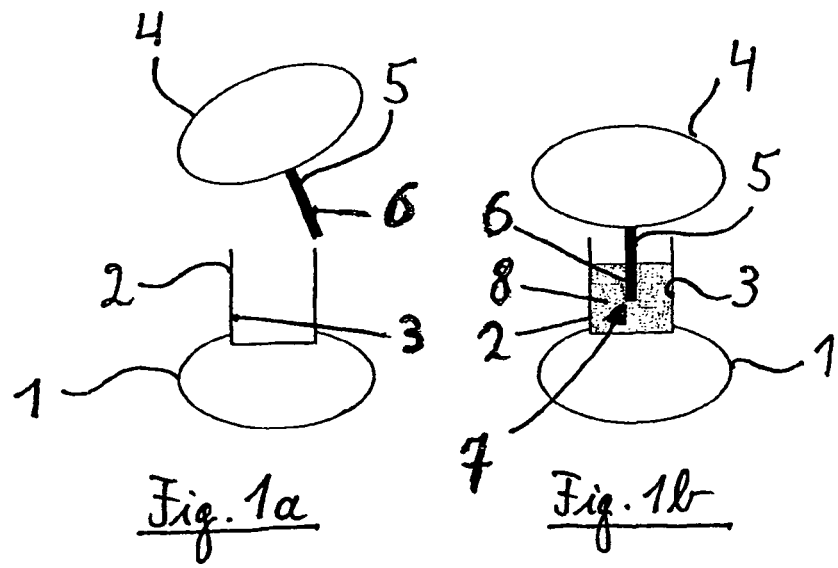

| | | | |
|---|---|---|---|
| 4,372,027 A * | 2/1983 | Hutchison | 29/448 |
| 6,945,727 B2 * | 9/2005 | Christman et al. | 403/109.8 |
| 2004/0011927 A1 | 1/2004 | Christman et al. | |
| 2005/0017609 A1 * | 1/2005 | Kucuk et al. | 312/228 |
| 2008/0230172 A1 | 9/2008 | Baebler | |

FOREIGN PATENT DOCUMENTS

| | | |
|---|---|---|
| CN | 2906468 | 5/2007 |
| DE | 2939284 | 4/1981 |
| DE | 3440240 | 3/1986 |
| DE | 3739646 | 7/1988 |
| DE | 4124627 | 1/1993 |
| EP | 1528157 | 5/2005 |
| JP | 61095129 | 5/1986 |
| WO | WO2007/062537 | 6/2007 |

OTHER PUBLICATIONS

Manfred Heuer "Gartenzuan: Pfosten Einbetonieren" Internet Article Jul. 10, 2004 XP002505272.

G. Wurtemberger "Fachkunde fur metallverarbeitende Berufe" 1976 XP002506324.

* cited by examiner

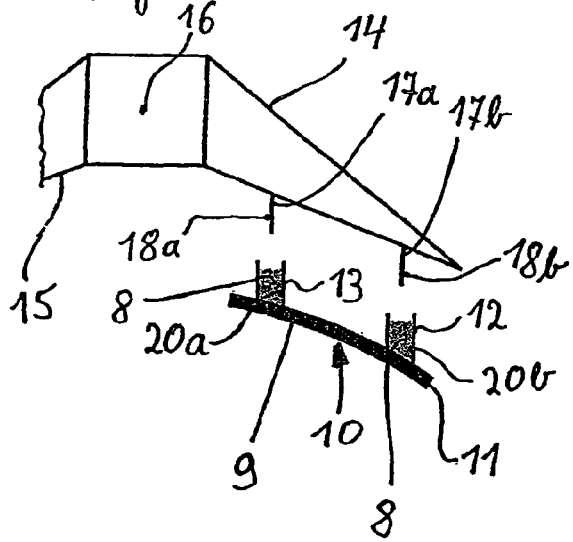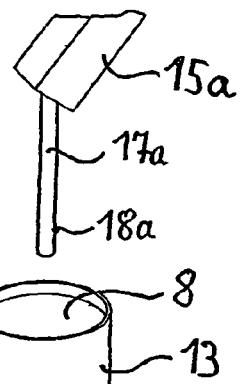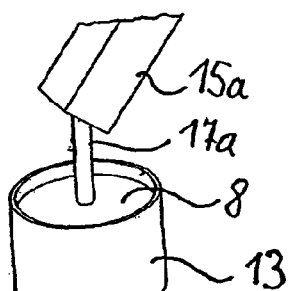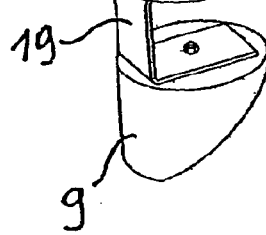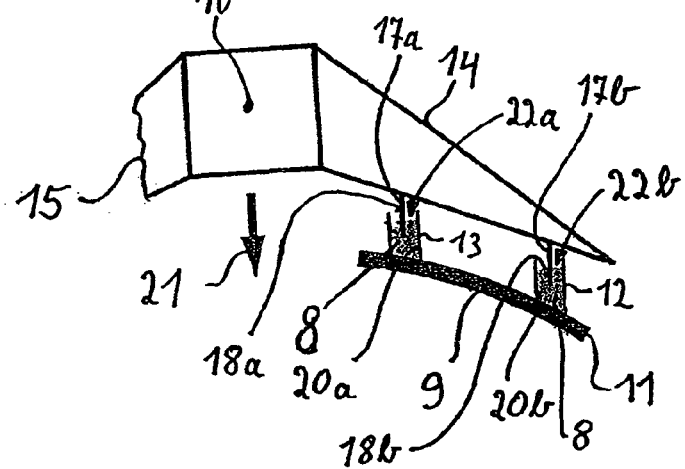

JOINING METHOD

CROSS-REFERENCE TO RELATED APPLICATIONS

This application is the National Stage of International Application No. PCT/EP2008/006444, filed on Aug. 6, 2008, which claims the priority of German Application No. 102008010884.7, filed on Feb. 25, 2008. The contents of both applications are hereby incorporated by reference in their entirety.

The invention relates to a joining method for the permanent mechanical connection of two joining components to one another.

To be able to arrange and fix joining components in a desired joining position relative to one another, different techniques are used. It is known to join aligned and fixed parts by means of screw connections and rivet connections. Here, adjustment facilities are provided by the design of slots or the design of specifically configured recesses. These involve a non-positively locking, in particular frictionally engaging connection. Here, adjusting devices having threaded elements may be provided, which enable the realization of linear tensile and compressive adjusting movements and the realization of rotational compensating movements by means of joints which should additionally be provided. Undesired gaps can be compensated by underlaying compensating elements such as shims, adjusting foils or spacer plates. The use of clampable adjusting elements, for example clampable pipe sleeves, enables the realization of rotatable and/or linearly compensating joining connections. In the case of large-area adhesive bonds, it is possible to realize tolerance-compensating joining methods within the scope of the mobility of the adhesive surfaces relative to one another.

In said methods, problems occur when the joining components to be connected to one another have tolerance deviations in their dimensions and tolerance compensation must be carried out when arranging the joining components in their relative joining position with respect to one another. Since the joining components can be freely positioned in space, this results in six degrees of freedom or adjustment directions or possibilities in which tolerance compensation must be possible if required. In the known methods, this is possible only by means of iterative, successive multiple execution or serial implementation of the individual method steps. In the case of mechanical fixing by means of clamping and/or frictional engagement, stresses are also generated in the components, which stresses can trigger or form undesired deformations. There is likewise the risk of the joining components which are aligned relative to one another slipping as the clamping forces are applied, for example on account of elastic deformation of the components or of one of the joining components.

By contrast, the invention is based on the object of providing a solution with which a joining method which is improved and simplified with regard to the ability to compensate joining component dimension deviations is provided.

In a joining process of the type specified in the introduction, the object is achieved according to the invention by means of a joining method for the permanent mechanical connection of two joining components to one another, which method comprises the steps:
a) positionally accurate alignment of a first and a second joining component relative to one another into a joining position so as to form a joining gap between the joining surfaces of the joining components;
b) at least temporary fixing of the joining components in said joining position;
c) filling of the joining gap with a fluid joining medium and
d) hardening of the joining medium in the joining gap to form a permanent connection which forms cohesion and adhesion forces and which transmits the forces occurring between the joining components.

The above object is likewise achieved in the method specified in the introduction by means of a joining method for the permanent mechanical connection of two joining components to one another, which method comprises the steps:
a1) provision of a first joining component which has a holding container which comprises joining surfaces and which is filled with liquid joining medium;
b1) positionally accurate alignment of the first and a second joining component relative to one another into a joining position, in which joining surfaces of the second joining component dip into the liquid joining medium in the holding container of the first joining component, and a joining gap is formed between the joining surfaces of the first and second joining components;
c1) at least temporary fixing of the joining components in said joining position and
d1) hardening of the joining medium in the joining gap to form a permanent connection which forms cohesion and adhesion forces and which transmits the forces occurring between the joining components.

Embodiments and refinements of the subjects of the invention emerge from the subclaims dependent in each case on claims 1 and 4.

The invention provides a joining process which can transmit forces and which is suitable in particular for connecting joining components which are to be precisely joined in a defined position with respect to one another, their joining position, and which in particular do not have correspondingly precise fitting and joining surfaces. The required precision of the assembly to be produced from the two joining components is obtained by the alignment of the joining components to be joined relative to one another and if necessary the at least temporary fixing of the joining components in said joining position, for example by means of corresponding holding devices, and the subsequent stress-free joining by means of the initially liquid and then hardening joining medium. Here, the joining position of the joining components is not changed during the hardening, and therefore then also in the hardened state of the joining medium. Here, the component tolerances arising on account of dimensional inaccuracies lead merely to the provided joining gap becoming dimensionally larger or smaller corresponding to the dimensional and if appropriate tolerance deviations of the joining components, but in this way the dimensional deviations are compensated overall in that the liquid medium adapts during hardening to the respective given geometric conditions and then, by hardening, forms between the joining components a connection which forms cohesion and adhesion forces. Overall, therefore, a method for compensating component tolerances during the assembly of individual joining components to form possibly highly precise structures or overall components is provided by means of stress-free joining using an initially fluid medium and the subsequent hardening thereof.

The method can be used in a multiplicity of applications. Said method is particularly advantageously suitable for the cost-effective manufacture of solar trough collectors, the efficiency of which is significantly dependent on the optical precision and therefore on the precise alignment of the components of the mechanical collector structure relative to one another. In this way, it is thus possible for the mirror elements and the supporting structure of a solar collector element to be arranged and positioned precisely relative to one another in an aligned fashion in a joining position and then permanently fixedly connected to one another, wherein said fastening of the two joining components to one another is free from stresses. Parabolic solar trough collectors are composed of a plurality of collector elements which have for example a parabola opening width of approximately 6 m and a length of approximately 12 m. The parabola channels are formed from mirror elements, and an absorber tube runs in the focal line, on which absorber tube the incident solar radiation is concentrated and transferred to the absorbed heat energy. The precision with which the mirror elements are aligned relative to one another and relative to the focal line is significant, because the energy recovery and therefore the efficiency of a solar thermal system of said type is dependent thereon. Said precision is determined by the positioning and fixing of the mirror elements to the respective supporting structures of the solar collectors. Here, the invention now provides a method which permits a permanent, stable and fixed connection of the joining components in their joining position, which method makes it possible for the components to be moved freely into the joining position and then compensates any present dimensional and/or precision deviations of the joining components with regard to their joining surfaces to be connected. Overall, a cost minimization in the manufacture of solar collector elements is obtained in this way, since the complex structures of a solar collector element continue to be aligned and arranged highly accurately and precisely relative to one another, wherein at the same time the demands on the dimensional accuracy of the individual joining components can be reduced, because dimensional and tolerance deviations can still be compensated by means of the joining process.

With the joining process according to the invention, six-axis tolerance compensation is possible in each case a single operative element of a joining component, specifically in the joining component element which has the joining surfaces. With corresponding selection of the joining medium, which is advantageously a casting resin, such as polyester resin, polyurethane resin, silicone resin, vinyl ester resin, but in particular an epoxy resin, no thermal loading is generated by the hardening casting resin. A further possible joining medium is hot-melt adhesive. Use is thus made of a joining medium which is preferably liquid at room temperature or in the range of <100° C., or else in the range of <200° C. To produce the joining connection, no joining forces need be applied. Furthermore, no inherent stresses are introduced into the joining components to be joined. Any present corrosion prevention layers of the joining components, for example a hot-dip galvanizing, remain intact during the joining. By means of the method according to the invention, different materials can be connected to one another. The connection can be released only by being destroyed, such that an inadvertent release, such as can occur for example with screw connections, does not occur with the connection according to the invention which cannot be released without destruction.

Figures 2A, 2B:
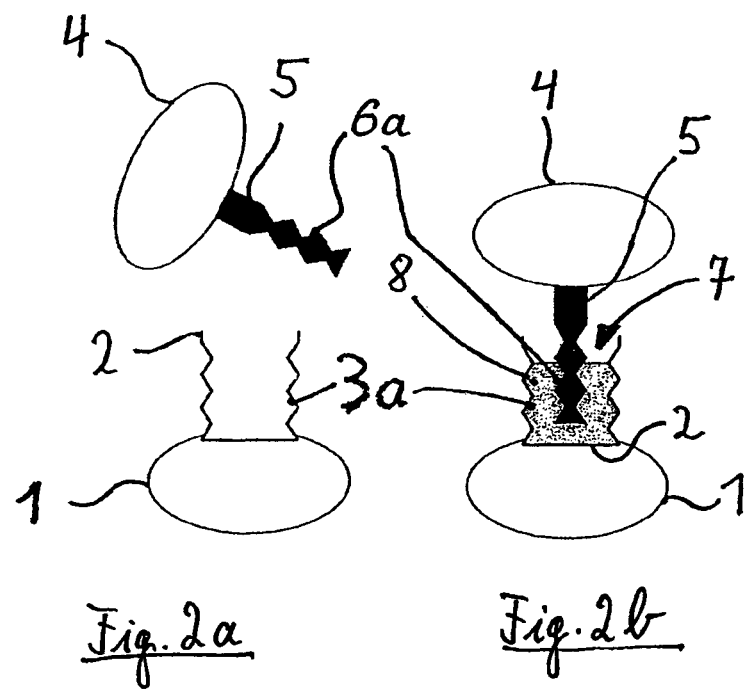

The invention will be explained in more detail by way of example below on the basis of the drawing, in which:

FIGS. 1a, 1b show a schematic illustration of a first exemplary embodiment of the method according to the invention, FIGS. 2a, 2b show a schematic illustration of a second exemplary embodiment of the method according to the invention, FIGS. 3a, 3b show a schematic illustration of first and second joining components of a solar collector element in a schematic illustration before positionally accurate alignment of the joining components relative to one another, and FIGS. 4a, 4b show joining components of the solar collector element in a schematic illustration in a positionally accurately aligned joining position relative to one another.

FIG. 1a shows, in a schematic illustration, a first joining component on which is arranged a reservoir or holding container 2, with the joining surfaces 3 of the first joining component 1 being formed by the inner wall surfaces of the holding container 2. Assigned to the first joining component 1 is a second joining component 4 which is provided with a rod-shaped anchor element 5, with the outer surfaces of the anchor element 5 forming the joining surfaces 6 of the second joining component 4. Proceeding for example from the relative position of the first and second joining components 1, 4 relative to one another illustrated in FIG. 1a, said joining components are changed in terms of their spatial position and rotated so as to be positioned in the positionally accurate alignment relative to one another illustrated in FIG. 1b. In said joining position illustrated in FIG. 1b, the outer surfaces of the anchor element 5, which form the joining surfaces of the second joining component, are arranged spaced apart from the inner wall surfaces of the holding container 3, which form the joining surfaces 3 of the first joining component 1, such that in this way a continuous joining gap 7 is formed. A positionally accurate alignment of the first and second joining components 1, 4 relative to one another into the illustrated joining position has thus taken place so as to form the joining gap 7 between the joining surfaces 6 of the joining components 1, 4. In said joining position, the first joining component 1 and second joining component 4 are at least temporarily fixed in their relative position with respect to one another. The joining gap 7 is thereafter filled with a fluid joining medium 8. The fluid joining medium is a casting resin, for example a polyester resin, a polyurethane resin, a silicone resin, a vinyl ester resin, but in particular an epoxy resin or else a hot-melt adhesive, which is poured in the liquid state of aggregation into the joining gap 7. Said joining medium 8 then hardens in the joining gap 7 and forms a permanent connection which forms cohesion and adhesion forces and which transmits the forces occurring between the first and second joining components 1, 4. After the hardening, the first joining component 1 and second joining component 4 are thus permanently fixed in their relative position with respect to one another defined by the joining position. Therefore, the initially provided at least temporary fixing of the first and second joining components 1, 4 relative to one another can be eliminated after the joining medium 8 has at least partially hardened. In the exemplary embodiment illustrated in FIGS. 1a and 1b, the anchoring element 5 dips only partially into the holding container 2, and also only partially into the joining medium 8 with which said holding container 2 is filled. Consequently, in this exemplary embodiment, only the regions of the outer surfaces of the anchoring elements 5 form the joining surfaces 6 which dip into the joining medium 8. The further provided outer surface region of the anchoring element 5 may duly be of identical design and shape to the joining surfaces 6, but does not contribute to the non-positively locking and if appropriate positively locking connection of the first joining component 1 and second joining component 4. The same applies to the joining surfaces 3 of the joining component 1.

In an embodiment which is not illustrated, it may also be possible for example for that end surface of the anchoring element 5 which faces toward the first joining component 1 to be formed as a plate-shaped molding which approximately corresponds to the inner cross section of the holding container 2, which molding then comes into contact with the joining medium 8, which is poured into the holding container 2 only up to the level required for this purpose, by means only of its outer surface facing toward the first joining component 1. In this case, the transmission of force in the first joining component 1 and second joining component 4 then takes place only via said areal coupling. This is an option which is used if the force and torque transfer thereby possible permanently ensures adequate mechanical stabilization and fixing of the aligned joining position between the first joining component 1 and second joining component 4.

The exemplary embodiment according to FIGS. 2a and 2b differs from the exemplary embodiment according to FIGS. 1a and 1b only in that the joining surfaces 3a of the first joining component 1 and the joining surfaces 6a of the second joining component 4 form undercuts which, after the solidification of the joining medium 8, cause a positively locking connection to be formed between the anchoring element 5 and the holding container 2. Since the other components are identical to those of the exemplary embodiment according to FIGS. 1a, 1b and also have the same function and use is likewise made of the identical method thereto, these are provided with identical reference symbols in FIGS. 2a and 2b.

FIGS. 3a, 3b, 4a and 4b show a slightly modified method which is particularly advantageously used for the manufacture of solar collector elements.

FIG. 3a schematically illustrates a first joining component 9 which is of mirrored design on its concavely curved outer surface 10. The first joining component 9 therefore forms a mirror element 11 of a solar collector element. On the (rear) side facing away from the mirrored outer surface 10, the first joining component 9 has formed and arranged on it two holding containers 12, 13. A liquid joining medium 8 is situated in the holding containers 12, 13, wherein this is the same medium as in the exemplary embodiments according to FIGS. 1a, 1b, 2a and 2b. The second joining component 14 also schematically illustrated in FIG. 3a is a steel and/or supporting structure 15, schematically illustrated in a partial view, of a solar connector element, to which steel and/or supporting structure 15 the mirror elements 11 of the solar collector element are fastened and which steel and/or supporting structure 15, in the application, is generally pivoted uniaxially about an axis 16 so as to follow the course of the sun. Anchoring pins or anchoring bolts 17a, 17b protrude on the second joining component 14 or from the steel and/or supporting structure 15, the outer surfaces of which anchoring pins or anchoring bolts 17a, 17b, similarly to the outer surfaces of the anchoring element 5 of the embodiment according to FIGS. 1a and 1b, form the joining surfaces 18a, 18b of the second joining component 14.

FIG. 3b shows a slightly less schematic illustration of a physical embodiment of a partial region of the second joining component 14 according to FIG. 3a. FIG. 3b shows a supporting structure arm 15a of the steel and/or supporting structure 15, on which supporting structure arm 15a an anchoring pin or anchoring bolt 17a is arranged in a projecting fashion. Also illustrated is a part of the rear side of the first joining component 9 on which the holding container 13 is arranged with the interposition of a U-shaped bracket element 19. The liquid joining medium 8 is situated in the holding container 13.

Firstly provided is the first joining component 9 which has joining surfaces 20a, 20b on the inner wall sides of the holding containers 12, 13. Here, the holding containers 12, 13 are already filled with the liquid joining medium 8. This takes place for example by virtue of the mirror element 11 being placed with the mirrored side downward into a first holding device (not illustrated) and the holding containers 12, 13 being filled with the liquid joining medium 8. A positionally accurate alignment of the first and second joining components 9, 14 relative to one another into a joining position is then carried out. Here, for example in the starting position illustrated in FIGS. 3a and 3b, the steel and/or supporting structure 15 is suspended, in the position illustrated in FIGS. 3a and 3b, in a second holding device (likewise not illustrated) which is arranged above the first holding device and which holds the mirror element 11, and said steel and/or supporting structure 15 is positioned with its anchoring pins or anchoring bolts 17a, 17b above the holding containers 12, 13. By moving the first and second holding devices together in the direction of the arrow 21 (see FIG. 4a), the first joining component 9 and the second joining component 14 are then moved together and at the same time aligned in their exact joining position. In said joining position, as can be seen from FIGS. 4a and 4b, the joining surfaces 18a, 18b of the second joining component 14 then dip into the liquid joining medium 8 in the holding containers 12, 13 of the first joining component 9. Here, a joining gap 22a, 22b is formed in each case between the joining surfaces 18a, 18b of the second joining component 14 and the joining surfaces 20a, 20b of the first joining component 9. In said joining position illustrated in FIGS. 4a and 4b, the joining components 9, 14 are then at least temporarily fixed, and the joining medium 8 in the joining gaps 22a and 22b hardens to form a permanent connection which forms cohesion and adhesion forces and which transmits the forces occurring between the joining components 9, 14. The at least temporary fixing of the first and second joining components 9, 14 in the joining position is subsequently eliminated after the joining medium has at least partially hardened, such that the fixing of the two components relative to one another then takes place exclusively by means of the connection formed by the now-hardened joining medium 8. In the embodiment according to FIGS. 3a, 3b, 4a, 4b, too, the formation of the joining gaps 22a, 22b and the formation of the permanently fixed connection by is obtained by dipping of the anchoring pins or anchoring bolts 17a, 17b into the liquid joining medium 8 provided with the first joining component 9.

The invention claimed is:

1. A method for producing a solar trough collector, said method comprising fastening a mirror element to a steel and/or supporting structure, wherein said mirror element forms a first joining component of said solar trough collector and said steel and/or supporting structure forms a second joining component of said solar trough collector, wherein said mirror element is connected to said steel and/or supporting structure, and wherein said mirror element comprises a holding container and a mirrored side facing away from said holding container of said solar trough collector, aligning said mirror element as said first joining component and said steel and/or supporting structure as said second joining component relative to one another into a joining position so as to form a joining gap between joining surfaces of said joining components, at least temporarily fixing said joining components in said joining position, wherein at least temporary fixing said joining components in said joining position comprises laying said mirror element with said mirrored side thereof downward in a first holding device, suspending said steel and/or supporting structure in a second holding device arranged above said mirror element, and moving said first and second holding devices into said joining position, filling said joining gaps with a fluid joining medium, and allowing said fluid joining medium to harden in said joining gap to form a permanent connection that causes cohesion and adhesion forces and that transmits said forces occurring between said joining components, wherein said first and second holding devices are held in said joining position until said joining medium has at least partially hardened.

2. The method according to claim 1, further comprising discontinuing said step of at least temporarily fixing said joining components in said joining position after said joining medium has at least partially hardened.

3. The method according to claim 1, further comprising causing said joining surfaces of said first joining component to form a reservoir or holding container for holding said liquid joining medium.

4. The method according to claim 1, wherein, in said joining position of said second joining component, said joining surfaces of said second joining component dip into said reservoir or holding container.

5. The method according to claim 1, further comprising providing said joining surfaces of said joining components with undercuts that form a positively locking connection with said hardened joining medium.

6. The method according to claim 1, wherein said second joining component is formed by said steel and/or supporting structure, or at least a part of said steel and/or supporting structure of said solar collector element.

7. The method according to claim 1, wherein anchoring pins or bolts that protrude from said steel and/or supporting structure are dipped into said holding container as joining surfaces of said second joining component.

8. A method for producing a solar trough collector comprising, said method comprising fastening a mirror element to a steel and/or supporting structure, wherein said mirror element forms a first joining component of said solar trough collector and wherein said steel and/or supporting structure forms a second joining component of said solar trough collector, wherein said mirror element comprises a holding container and a mirrored side facing away from said holding container of said solar trough collector, and wherein said mirror element is connected to said steel and/or supporting structure, providing said mirror element as said first joining component having a holding container having joining surfaces, said holding container being filled with liquid joining medium, aligning said mirror element as said first and said steel and/or supporting structure as said second joining component relative to one another into a joining position, wherein, in said joining position, joining surfaces of said steel and/or supporting structure dip into said liquid joining medium in said holding container of said mirror element, and wherein a joining gap is formed between said joining surfaces of said mirror element and said steel and/or supporting structure, at least temporarily fixing said joining components in said joining position, wherein at least temporary fixing said joining components in said joining position comprises laying said mirror element with said mirrored side downward in a first holding device, and suspending said steel and/or supporting structure in a second holding device arranged above said mirror element, and moving said first and second holding devices into said joining position, allowing said joining medium to harden in said joining gap to form a permanent connection that causes cohesion and adhesion forces and that transmits said forces occurring between said joining components, wherein said first and second holding devices are held in said joining position until said joining medium has at least partially hardened.

9. The method according to claim 8, further comprising discontinuing said step of at least temporarily fixing said joining components in said joining position after said joining medium has at least partially hardened.

10. The method according to claim 8, wherein, in said joining position of said second joining component; said joining surfaces of said second joining component dip into said reservoir or holding container.

11. The method according to claim 8, further comprising providing said joining surfaces of said joining components with undercuts that form a positively locking connection with said hardened joining medium.

12. The method according to claim 8, wherein said second joining component is formed by said steel and/or supporting structure, or at least a part of said steel and/or supporting structure of said solar collector element.

13. The method according to claim 8, wherein anchoring pins or bolts that protrude from said steel and/or supporting structure are dipped into said holding container as joining surfaces of said second joining component.

14. The method of claim 13, wherein said anchoring pins or bolts are profiled.

* * * * *